UNITED STATES PATENT OFFICE.

LOUIS DE PLANQUE, OF NEW YORK, N. Y., ASSIGNOR TO HIMSELF AND FRANCIS STROM, OF SAME PLACE.

IMPROVEMENT IN COMPOSITIONS FOR ARTIFICIAL MARBLE.

Specification forming part of Letters Patent No. 182,647, dated September 26, 1876; application filed March 25, 1876.

*To all whom it may concern:*

Be it known that I, LOUIS DE PLANQUE, of the city, county, and State of New York, have invented an Improved Composition for Artificial Marble, of which the following is a specification:

My invention relates to an improved composition for producing articles in imitation of marble and other stones, the composition admitting of being cast into molds and polished in perfect manner.

The composition consists of plaster-of-paris dissolved in whey under admixture of starch, glue, and sulphate of zinc.

The ingredients are mixed in the following manner, and in about the proportions given: One hundred parts of plaster-of-paris are stirred thoroughly with fifty parts of whey, under addition of five parts of starch, two parts of glue, and one part, more or less, of sulphate of zinc, until a mass of the consistency of dough is obtained, that may be colored to the style of marble or stone to be produced. The mass is then cast and pressed into molds, in which it remains a few hours until completely hardened. It is taken out of the molds when hard and polished, the composition being capable of a high degree of polish.

Any imitation of marble or other stone may be produced by this composition, and the same be applied with advantage for ornaments, busts, and other purposes.

Having thus fully described my invention, I claim as new and desire to secure by Letters Patent—

A composition for artificial marble and other stones, consisting of plaster-of-paris, whey, starch, glue, and sulphate of zinc, prepared substantially in the manner and the proportions set forth.

LOUIS DE PLANQUE.

Witnesses:
 FRANCIS STROM,
 PAUL GOEPEL.